United States Patent [19]

Zajic

[11] Patent Number: 4,726,196

[45] Date of Patent: Feb. 23, 1988

[54] TEMPERATURE CONTROL APPARATUS INCLUDING AIR RETURN BULKHEAD FOR MOUNTING IN A TRANSPORTABLE BODY

[75] Inventor: Albert H. Zajic, Oklahoma City, Okla.

[73] Assignee: American Trailers, Incorporated, Oklahoma City, Okla.

[21] Appl. No.: 938,152

[22] Filed: Dec. 4, 1986

[51] Int. Cl.[4] ............................................. B60H 1/32
[52] U.S. Cl. ...................................... 62/239; 62/408; 98/6
[58] Field of Search ............... 62/239, 407, 408, 413, 62/418; 98/6; 165/41, 53, 55

[56] References Cited

U.S. PATENT DOCUMENTS

| | | | |
|---|---|---|---|
| 2,275,721 | 3/1942 | Bonsall | 62/17 |
| 2,633,714 | 4/1953 | Wehby | 62/6 |
| 2,677,244 | 5/1954 | Wehby | 62/6 |
| 2,677,246 | 5/1954 | Wehby | 62/91.5 |
| 2,780,923 | 2/1957 | Jones | 62/2 |
| 3,057,284 | 10/1962 | Learmont | 98/6 |
| 3,175,606 | 3/1965 | Talmey et al. | 165/41 |
| 3,216,216 | 11/1965 | Rowley | 62/204 |
| 3,246,592 | 4/1966 | Rath | 98/31 |
| 3,362,179 | 1/1968 | Kirkpatrick | 62/97 |
| 3,411,312 | 11/1968 | Sigl et al. | 62/180 |
| 3,421,340 | 1/1969 | Von Berg | 62/239 |
| 3,486,241 | 12/1969 | Coyle et al. | 34/22 |
| 3,625,022 | 12/1971 | Johnson | 62/159 |
| 3,792,595 | 2/1974 | Willis | 62/239 X |
| 4,009,589 | 3/1977 | Webb et al. | 62/180 |
| 4,132,088 | 1/1979 | Grosskofp | 62/239 X |
| 4,143,588 | 3/1979 | Exler | 98/6 |
| 4,250,956 | 2/1981 | Ohtani | 165/36 |
| 4,320,628 | 3/1982 | Okajima | 62/186 |
| 4,399,737 | 8/1983 | Severson | 98/6 |
| 4,505,126 | 3/1985 | Jones et al. | 62/239 |
| 4,531,377 | 7/1985 | Zajic | 62/187 |
| 4,553,403 | 11/1985 | Taylor | 62/239 |

Primary Examiner—William E. Tapolcai
Attorney, Agent, or Firm—Laney, Dougherty, Hessin & Beavers

[57] ABSTRACT

A temperature control apparatus for mounting in a transportable body includes a false ceiling having a plurality of ducts defined therethrough. The ducts extend through a single compartment or between two or more compartments when such two or more compartments are defined within the transportable body. A shutter mechanism controls the flow of temperature-treated air flowing between compartments, thereby controlling the temperature in the various compartments. To provide a flow of temperature-treated air into the apparatus, the apparatus includes an air channeling structure which can be adjusted to divert different quantities of air into the apparatus. The temperature control apparatus also includes an air return bulkhead connectible to the transportable body for channeling return air from the false ceiling directly to the unit by which the air is temperature-treated.

18 Claims, 8 Drawing Figures

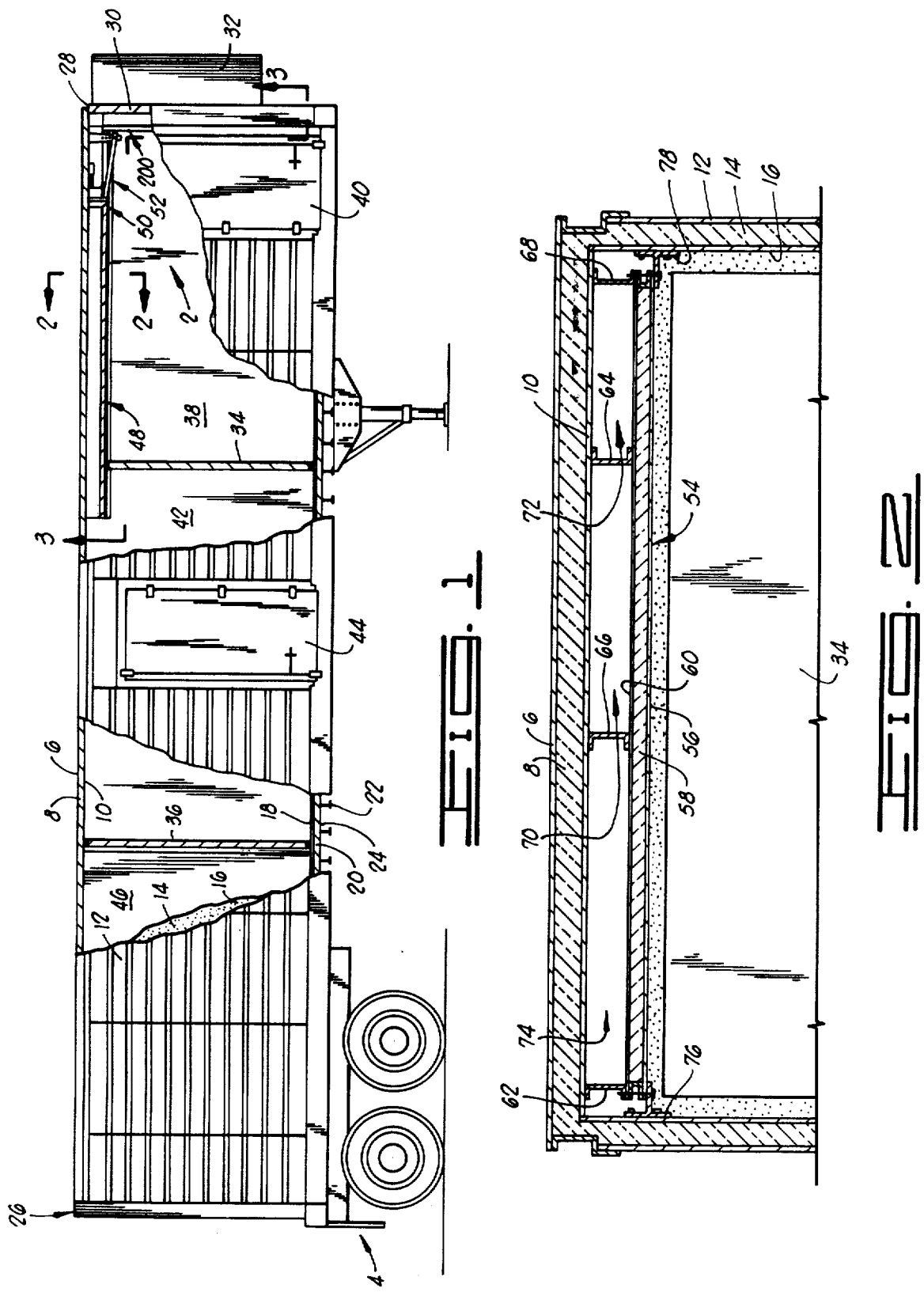

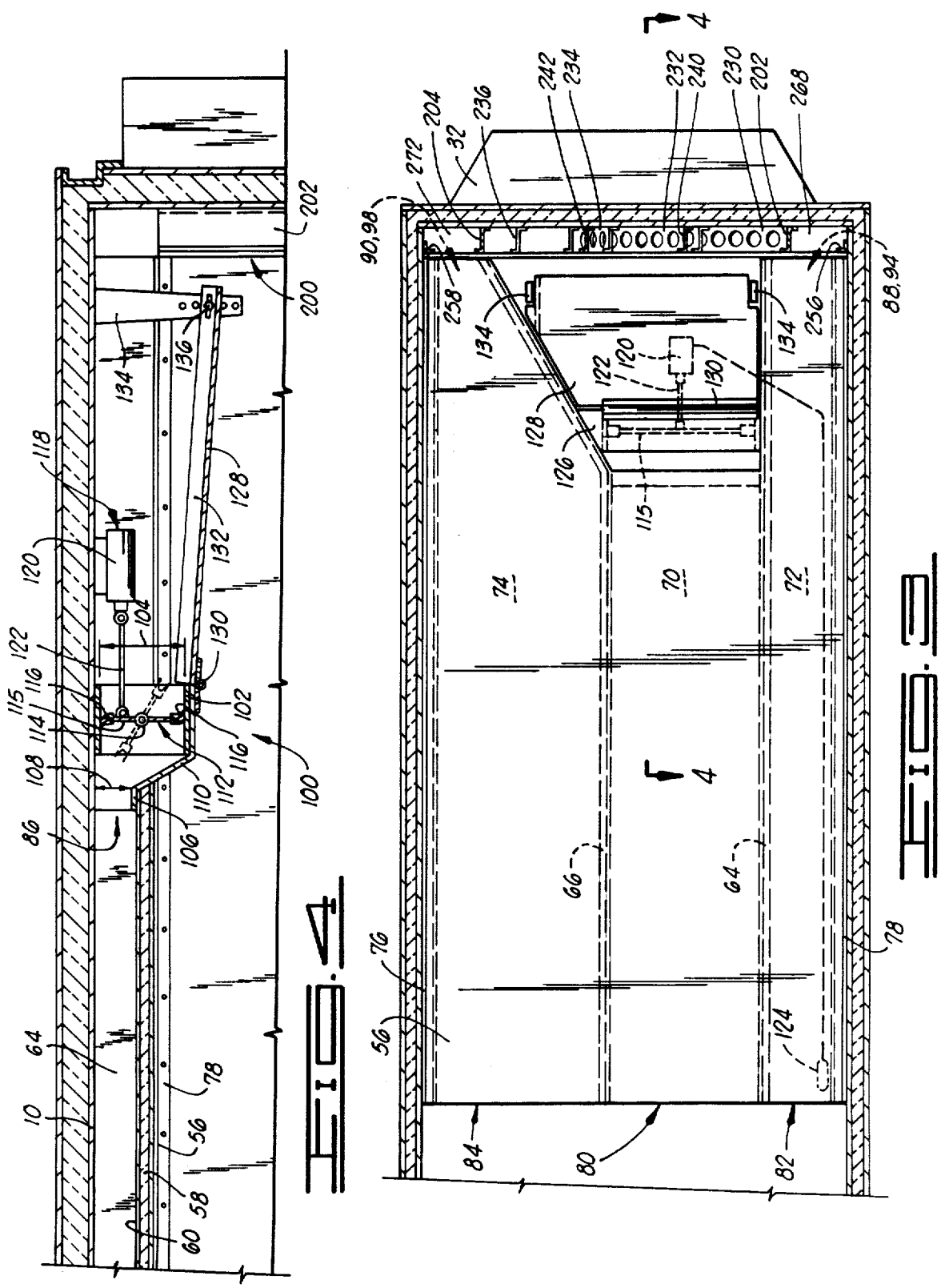

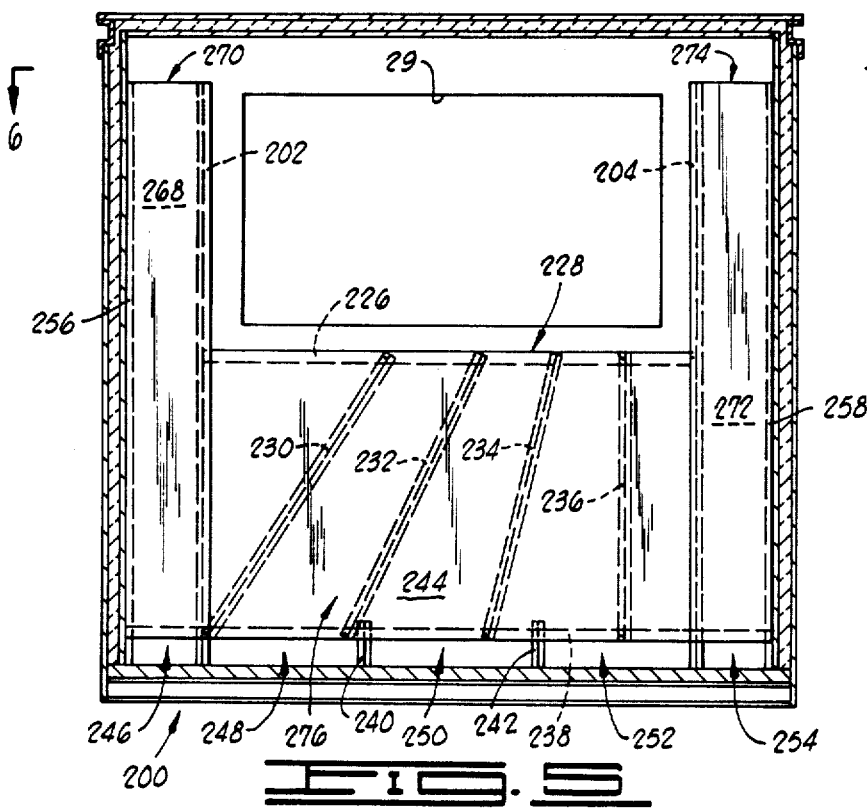
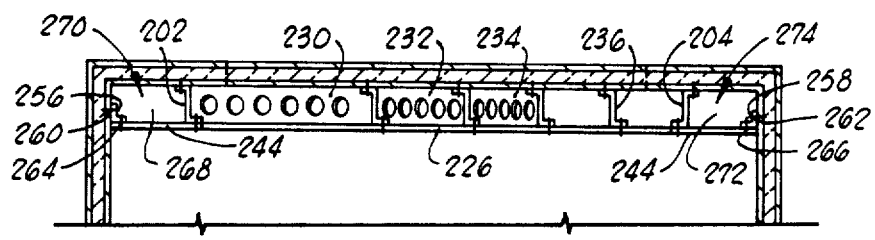
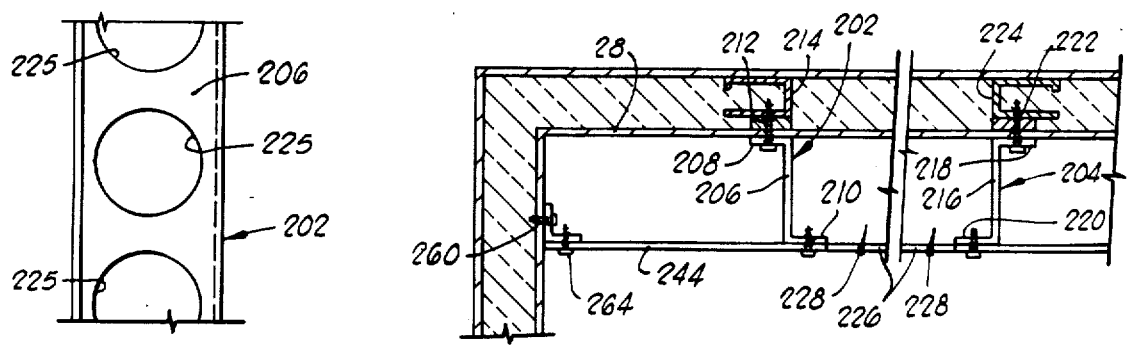

TEMPERATURE CONTROL APPARATUS INCLUDING AIR RETURN BULKHEAD FOR MOUNTING IN A TRANSPORTABLE BODY

BACKGROUND OF THE INVENTION

This invention relates generally to apparatus for providing temperature control to a transportable body and more particularly, but not by way of limitation, to an air return bulkhead which can be removably installed inside a transportable body, such as a semitrailer or a truck body, adjoining a false ceiling removably mounted in the transportable body so that return air flowing through the false ceiling is returned directly to an air treatment mechanism through the bulkhead.

In the food industry many different types of food products, such as frozen foods and dairy products, generally diary products, packaged meats, and produce, as well as canned and packaged products, are frequently transported in a single trailer or truck body. When different types of products are carried in a single transportable body, each type is generally placed in its own compartment within the transportable body, which body is divided into compartments by movable or stationary insulated partitions. Because of the different types of products, a different temperature is often to be maintained in each compartment to insure that each type is properly preserved. Therefore, there is the general need for some type of apparatus which can be placed in a transportable body to provide different temperatures, as desired, in each compartment.

Several types of equipment have been used in the past to refrigerate or heat the air within a compartmented transportable body. However, these types have generally been built into the transportable body as an integral part thereof so that they cannot be removed without disassembling the body. Such integral types also cannot be added to old transportable bodies. Therefore, there is the more particular need for a temperature control apparatus which can be added to a transportable body either during its manufacture or after it has been manufactured.

Because many transportable bodies have mechanical refrigeration and heating systems for generally providing cooled or heated air within the body, there is the need for the temperature control apparatus to be compatible with such systems. In other words, the temperature control apparatus should be able to provide different temperatures for different compartments from a single source of mechanically refrigerated or heated air.

It is also desirable that the temperature control apparatus be constructed for more efficiently distributing refrigerated or heated air even when the transportable body is configured as a single compartment. The apparatus is also to be constructed with a relatively smooth surface so that more efficient sealing of a movable or removable partition can be effected within the transportable body when more than one compartment is defined therein.

Because the products which are to be transported in the transportable body are often stacked throughout the entire volume of the transportable body, the temperature control apparatus should also be constructed to prevent those products which come in contact with the apparatus from freezing when one compartment is to be maintained at a freezing or subfreezing temperature and an adjacent or other compartment is to be maintained at a temperature above freezing.

To insure accurate control of the temperatures in each compartment, the temperature control apparatus should also include temperature sensing means for sensing at least one temperature and appropriately controlling the apparatus to provide the proper amount of temperature-treated air to the respective compartments. This temperature-treated air is to be provided by a known type of mechanical refrigeration and heating unit, for example, and is to be recycled through the compartment into which the unit disperses the temperature-treated air. The temperature control apparatus should include suitable air channeling means for adequately receiving a selectable quantity of the temperature-treated air.

Furthermore, it is desirable that the temperature control apparatus be constructed to require a minimum amount of space so that the load space for cargo is not significantly reduced when the temperature control apparatus is installed in the transportable body.

The foregoing needs have been satisfied by my prior invention described in U.S. Pat. No. 4,531,377. In my prior invention, however, return air became mixed with air in the compartment adjacent the air treatment mechanism, which mixing could affect the temperature of the air within such compartment. Therefore, it has developed that there is the further need for an improved apparatus by which improved return air control is obtained to prevent mixing by directly conducting the return air into the intake of the air treatment mechanism.

SUMMARY OF THE INVENTION

The present invention meets the aforementioned needs by providing a novel and improved temperature control apparatus which can be mounted, for either permanent or temporary installation, in a transportable body either during manufacture of the transportable body or at a time after manufacture of the body.

The present invention can sense at least one temperature and, in response thereto, provide temperature-treated air to the various compartments in appropriate quantities to maintain selected temperatures. This temperature control is even efficiently performed when the transportable body is configured as a single compartment.

The present invention is constructed so that it has a smooth undersurface which permits efficient sealing with a movable or removable partition which can be used to separate two compartments. The present invention is also constructed to operate with conventional mechanical sources of refrigerated and heated air; however, the present invention is not limited to use with such mechanical sources. Air is returned through the present invention to such sources so that the air can be recycled. Appropriate quantities of temperature-treated air are received into the present invention through an air channeling means which insures proper temperature and air flow control.

The present invention includes an insulated surface which prevents commodities in one compartment from being frozen when they are in contact with the insulated surface even though an adjacent compartment is being maintained by the present invention at a freezing or subfreezing temperature.

The present invention is also constructed so that it requires only a small amount of space, thereby preventing any great reduction of usable cargo space within the transportable body in which the present invention can be mounted.

The present invention is specifically constructed in a preferred embodiment to include a removable air return bulkhead adjoining a removable false ceiling array of ducts which provide the aforementioned features of the present invention. The bulkhead channels the return air from the false ceiling directly to the inlet of the air treatment mechanism to prevent or minimize mixing of the return air with the temperature treated air within the adjacent food-storage compartment. The components of the present invention can be installed in a permanent manner if desired.

Broadly, the present invention includes an apparatus for providing temperature control to a compartment of a transportable body having a conventional ceiling and having air treatment means for providing temperature-treated air to a location within the interior of the transportable body adjacent the ceiling, which air treatment means is mounted to the transportable body through a wall thereof depending from the conventional ceiling. This apparatus comprises a duct housing connected to the transportable body adjacent the conventional ceiling, which duct housing includes: first duct means for channeling temperature-treated air away from an outlet of the air treatment means and into the compartment of the transportable body; and second duct means, connected to the first duct means, for channeling air from the compartment of the transportable body towards the wall through which the air treatment means is mounted to the transportable body. The apparatus further comprises air return bulkhead means, connected to the transportable body adjacent the wall through which the air treatment means is mounted to the transportable body, for communicating to an inlet of the air treatment means the air channeled through the second duct means.

The air return bulkhead means forms part of a bulkhead assembly which in a preferred embodiment includes, in the environment of a trailer having a front wall and two side walls extending from opposite ends of the front wall: a first vertical support member having a first web through which a first hole is defined; first attachment means for attaching the first vertical support member to the front wall of the trailer between one of the side wall of the trailer and the air treatment apparatus so that the first web extends from the inside surface of the front wall; a second vertical support member having a second web through which a second hole is defined; second attachment means for attaching the second vertical support member to the front wall of the trailer between the other side wall of the trailer and the air treatment apparatus so that the second web extends from the inside surface of the front wall; a first vertical bracket; third attachment means for attaching the first vertical bracket to one of the side walls of the trailer; a second vertical bracket; fourth attachment means for attaching the second vertical bracket to the other side wall of the trailer; a horizontal sill member; fifth attachment means for attaching the sill member to the first and second vertical support members intermediate the ends of the support members so that the sill member is spaced from the inside surface of the front wall of the trailer to define an opening communicating with the inlet of the air treatment apparatus; covering means for defining within the trailer an inner surface parallel to, and spaced from, the inside surface of the front wall of the trailer; and sixth attachment means for attaching the covering means to the first and second vertical support members, to the first and second vertical brackets and to the sill member so that an air outlet chamber is defined by lower portions of the first and second vertical support member and by the inside surface of the front wall and the covering means below the sill member, and further so that a first air return channel is defined by the first vertical support member, the one side wall, the inside surface and the covering means for channeling air downwardly for passage through the first hole into the air outlet chamber and return to the inlet of the air treatment apparatus through the outlet, and still further so that a second air return channel is defined by the second vertical support member, the other side wall, the inside surface and the covering means for channeling air downwardly for passage through the second hole into the air outlet chamber and return to the inlet of the air treatment apparatus through the outlet.

From the foregoing it is a general object of the present invention to provide a novel and improved temperature control apparatus for mounting in a transportable body. It is a more particular object to provide a means for returning the air which has been warmed, in the case of refrigerating, to the upper limits of the desired temperature, to a return air bulkhead through which the return air is recycled to the mechanical air treatment unit with a minimal amount of the return air mixing with the air in the food-storage compartment in which the air return bulkhead is mounted.

It is a further object of this invention to provide an improved apparatus for distributing refrigerated or heated air within a compartmented trailer or truck body.

Another object of this invention is to provide the different temperatures for the separate compartments from a single source of conditioned air.

Still another object is to provide a means for a more efficient distribution of refrigerated or heated air when the trailer or truck body is used as a single non-compartmented, single temperature unit.

It is still another object of this invention to provide a smooth surface at the underside of a false ceiling for more efficient sealing of a movable or removable partition thereagainst.

Another object of a preferred embodiment is to provide a refrigerated or heated air distribution system that can be installed in either a newly manufactured trailer or truck body, or can be installed in an already-in-service trailer or truck body with minimal effort and tools.

Still another object is to provide the means for controlling the temperature in different compartments for the various temperatures required by the respective commodities through use of one or more temperature sensing devices.

Another object is to provide the means by which the temperature-treated air can be prevented from entering one compartment if such air is not required, but at the same time permitting another compartment to receive the temperature-treated air as required.

Still another object is to provide an insulated surface that will effectively prevent commodities from being frozen if they are in contact with the underside of the false ceiling of the air distribution system even if one or more of the compartments is being operated at subfreezing temperatures.

It is still another object of this invention to provide the air distribution system in a small area, thereby minimizing the amount of cargo load space used by the present invention.

It is, accordingly, a major object of this invention to provide an improved apparatus for controlling the temperatures for transporting two or more different classes of food products within a single trailer or truck body.

Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a partially sectioned side elevational view of a compartmented semitrailer having the preferred embodiment of the present invention mounted therein.

FIG. 2 is an end sectional view of part of a false ceiling portion of the present invention mounted in the semitrailer, which view is taken as indicated by the line 2—2 shown in FIG. 1.

FIG. 3 is a bottom plan view of the present invention mounted in the semitrailer which is illustrated in partial section, which view is taken as indicated by the line 3—3 shown in FIG. 1.

FIG. 4 is a fragmentary side elevational sectional view of part of the present invention as indicated by the line 4—4 shown in FIG. 3.

FIG. 5 is a vertical elevational view of an air return bulkhead assembly of the present invention as viewed from within the semitrailer.

FIG. 6 is a plan view of the air return bulkhead assembly as viewed along line 6—6 shown in FIG. 5.

FIG. 7 is a cut-out portion of a support member of the air return bulkhead, illustrating air flow openings defined through the support member.

FIG. 8 is an enlarged view of portions of FIG. 6 illustrating details of the mounting of the air return bulkhead assembly to the semitrailer.

DETAILED DESCRIPTION OF THE PREFERRED EMBODIMENT

With reference to the drawings, the preferred embodiment of the present invention will be described. The apparatus constructed in accordance with the preferred embodiment is generally identified in FIG. 1 by the reference numeral 2. FIG. 1 shows the apparatus 2 mounted in a transportable body particularly illustrated as a conventional semitrailer 4 which is used for hauling both perishable and non-perishable commodities as known to the art. The mounting of the apparatus 2 can be in either a permanent manner (i.e., not readily removable) or a temporary manner (i.e., readily removable); however, the described preferred embodiment is of the readily removable type because it can be readily installed or removed in pre-existing trailers as well as during manufacture of new trailers.

The semitrailer 4 includes a roof 6 which is insulated with a suitable insulation material 8. The underside of the roof 6 and the insulation material 8 are lined with a conventional, fixed ceiling 10. The conventional ceiling 10 is a liner made of either metallic or non-metallic material as known to the art and as is suitable for the particular usage of the semitrailer 4.

The semitrailer 4 also includes side walls 12 which depend from the roof 6 and which include an insulation material 14. The interiors of the side walls 12 are lined with a suitable liner 16.

The semitrailer 4 still further includes a floor 18 which is installed over a suitable quantity of insulating material 20. Lateral structural member 22 are disposed beneath an outer lining 24 of the floor 18.

The semitrailer 4 includes a rear wall 26 in which one or more rear doors (not shown) are disposed as known to the art.

The semitrailer 4 also includes a fixed front wall 28 which depends from the roof 6 and the conventional ceiling 10 and from the vertical ends of which front wall the sides walls 12 extend rearwardly. The wall 28 includes insulation material 30 disposed between wall liners in a manner similar to the other walls of the semitrailer 4. The front wall 28 has an opening 29 (FIG. 5) with appropriate reinforcements as known to the art for supporting a mechanical type of refrigeration and heating unit 32 of a type as known to the art. The unit 32 provides temperature-treated air to the interior of the semitrailer 4.

The illustrated embodiment of the semitrailer 4 is divided into compartments by means of a front insulated partition 34 and a rear insulated partition 36. In this configuration the semitrailer 4 is operable as a three-compartment carrier. The partition 34 and 36 can be moved by means of a track or other suitable means. When disposed in the three-compartment configuration shown in FIG. 1, a front compartment 38 defined between the front partition 34 and the front wall 28 is accessed by means of a door 40. A center compartment 42 defined between the front partition 34 and the rear partition 36 is accessible by means of a door 44. A rear compartment 46 is defined between the rear wall 26 and the rear partition 36 and is accessible through the rear door or doors disposed in the rear wall 26. It is to be noted that in the illustrated view the front partition 34 extends between an underside of a portion of the apparatus 2 of the present invention and the floor 18 of the semitrailer 4. Each of the partitions 34 and 36 has suitable seals around the edges thereof for providing thermally sealed junctions with the adjacent portion of the apparatus 2 or the semitrailer 4 as illustrated in FIG. 1.

The interior volume of the semitrailer 4 can be divided into any desired number of compartments as known to the art. For example, both partitions 34 and 36 can be removed so that a single compartment is defined within the semitrailer 4; the partition 36 can be removed so that two compartments are defined; and additional partitions can be added to define additional compartments. For purposes of simplicity of description, the following description of the apparatus 2 will be limited to a configuration of the semitrailer 4 including two compartments defined by the single partition 34.

The apparatus 2 of the present invention includes false ceiling means 48 for providing a first passageway and a second passageway which extend, in the illustrated embodiment, between the two compartments defined on either side of the partition 34. The apparatus 2 also includes passageway control means 50 for controlling the introduction of the temperature-treated air into one of the passageways. The temperature-treated air from the air treatment unit 32 is channeled into the passageway control means 50 by an air channeling means 52. Each of these elements generally illustrated in FIG. 1 will be more particularly described with reference to FIGS. 2-4.

The false ceiling means 48 of the preferred embodiment includes a duct housing 54 having a plurality of ducts defined therein. As shown in FIG. 2, the duct housing 54 includes a lower liner member 56 made of a suitable metallic or non-metallic material. The lower liner member 56 forms the bottom of the false ceiling means 48 and functions as a second ceiling of the semitrailer 4 in the duct area.

Disposed above the lower liner member 56 is a layer of a suitable thermal insulation material 58. The material 58 is maintained adjacent the lower liner member 56 by an upper liner member 60 made of a suitable material. Extending longitudinally along the upper liner member 60 of the preferred embodiment are four elongated members 61, 64, 66, and 68. The elongated members 62–68 are laterally spaced from each other so that three air ducts 70, 72 and 74 are defined in side-by-side relationship by the upper liner member 60, the elongated members 62–68, and the conventional ceiling (particularly the liner 10) when the false ceiling means 48 is mounted in the semitrailer 4. As shown in FIG. 2, the duct housing 54 extends across the lateral interior distance of the semitrailer 4. As best shown in FIG. 3, the three ducts extend parallel to each other with the central duct 70 offset toward the duct 72 so that the duct 74 is wider than the duct 72; however, the duct 70 could be centered or disposed in other desired configurations. More generally, only at least two ducts need by used: one for air out-flow and one for air return.

So that the apparatus 2 can be easily installed in or removed from a transportable body, the false ceiling means 48 further includes mounting means for removably mounting the duct housing 54 within the transportable body. The mounting means of the preferred embodiment includes a first angle bracket 75 which is connectible to one of the side walls of the semitrailer 4 and to the lower liner member 56 as shown in FIG. 2. The mounting means also includes a second angle bracket 78 which is connectible to the other side wall of the semitrailer 4 and to the lower liner member 56. Connection of the brackets 76 and 78 is by means of screws or other suitable connector means as known to the art.

When the false ceiling means 48 is installed in the semitrailer 4 as illustrated in the drawings, portions of the ducts are disposed in either one or the other of the compartments separated by the partition 34. It is to be noted that partition 34 sealingly engages the smooth surface of the lower liner 56 to effect a suitable thermal seal, and the partition 34 defines which portions of the false ceiling means 48 are disposed in which compartments. Those portions of the ducts which are in the compartment 42 as shown in FIGS. 1 and 3 include an outlet 80 of the duct 70, an inlet 82 of the duct 72, and an inlet 84 of the duct 74. Disposed within the compartment 38 are an inlet 86 of the duct 70, an outlet 88 of the duct 72, and an outlet 90 of the duct 74. The outlets 88 and 90 provide exit ports through which return air flows into an air return bulkhead 200 forming another part of the preferred embodiment of the present invention. The outlets 88, 90 adjoin the bulkhead 200 so that the return air does not first flow back into the compartment 38 from the compartment 42 before returning to the air treatment unit 32. The outlet 88 is defined by an opening 94 defined at an end of the duct 72 facing the front wall 28. The outlet 90 is defined by an opening 98 defined at an end of the duct 74 facing the front wall 28. It is to be noted that in the preferred embodiment the outlets 88 and 90 are disposed farther from the compartment 42 than is the inlet 86 of the duct 70.

The duct 70 is the center duct in the preferred embodiment and provides the passageway through which the temperature-treated air flows into the compartment 42. The ducts 72 and 74 function as return air ducts by which the return air is transferred from the compartment 42 to the bulkhead 200 for recycling through the refrigeration or heating unit 32. So that the temperature-treated air can be properly provided to the duct 70, the apparatus 2 includes the passageway control means 50 having a preferred embodiment which will be more particularly described with reference to FIG. 4.

The passageway control means 50 includes a damper housing 100 which has an inlet and an outlet defined therein. The damper housing 100 is connected to the duct housing 54 so that the inlet and outlet of the damper housing 100 are in fluid communication with the duct 70. The inlet of the damper housing 100 is defined by an inlet structure 102. The inlet structure 102 has a height indicated by the dimension line labeled with the reference numeral 104. The outlet of the damper housing 100 is defined by an outlet structure 106. The outlet structure 106 has a height represented by the dimension line labeled with the reference numeral 108. In the preferred embodiment the height 108 is shorter than the height 104. The damper housing 100 also includes a tapered neck portion 110 connecting the inlet structure 102 with the outlet structure 106.

The passageway control means 50 also includes a damper 112 pivotally connected to the inlet structure 102 of the damper housing 100. The pivotal connection is made in the preferred embodiment about a centrally located axle 114. The damper 112 can be pivoted between a closed position wherein a flow of air is prevented from passing into the duct 70, which closed position is that shown in solid lines in FIG. 4, and an open position wherein a flow of air is permitted to pass into the duct 70 through the outlet structure 106 of the damper housing 100, which open position is shown in phantom in FIG. 4. In the preferred embodiment the damper 112 includes a support member 115 specifically shown as a flat plate. The damper 112 also includes sealing means 116 disposed along the perimeter of the support member 115 for sealingly engaging the inlet structure 102 of the damper housing 100 when the damper 112 is in its closed position. The support member 115 and the sealing means 116 have a height which is greater than the height 104 when the sealing means 116 is disengaged from the damper housing 100.

The passageway control means 50 still further includes movement means for moving the damper 112 between its open position and its closed position. In the preferred embodiment the movement means includes a solenoid 118 having a body 120 connected to the damper housing 100 and further having a piston 122 slidably disposed in the body 120 and connected by suitable means to the support member 115 of the damper 112. The piston 122 is pivotally connected to the support member 115 so that longitudinal movement of the piston 122 relative to the apparatus 2 and the damper housing 100 causes the support member 115 to pivot about the axle 114. The movement means also includes thermostat means 124 (FIG. 3) for controlling the solenoid 118 is response to the temperature detected by a temperature sensor member of the thermostat means 124. In the preferred embodiment, the temperature sensor member of the thermostat means 124 is disposed in one of the return ducts 72 or 74. In the preferred embodiment the movement means functions as a temperature-responsive means for closing the passageway provided by the duct 70 to the temperature-treated air from the unit 32 when a predetermined temperature is detected in the return air duct in which the temperature sensor member is disposed.

To convey at least a portion of the temperature-treated air from an outlet of the unit 32 to the passageway control means 50, the apparatus 2 includes the air channeling means 52. The air channeling means 52 may include a channel member connected to the damper housing 100 for providing a channel to the inlet structure 102 as described in U.S. Pat. No. 4,531,377. Such a channel member is described therein as constructed and disposed so that the inlet structure 102 and the solenoid 118 are both contained within the air channeling volume defined by the channel member. In the presently described embodiment, however, the air channeling means 52 includes only air director means, connected directly to the damper housing 100, for adjustably directing a flow of the temperature-treated air towards the damper housing.

The air director means includes in the preferred embodiment a plate 128 pivotally connected by a hinge 130 to a horizontal extension of the tapered neck portion 110 adjacent the lower edge of the inlet structure 102. The plate 128 extends away from the hinge 130 to a location near the ends of the duct housing 54 having the outlets 88 and 90 defined therein. The plate 128 has at least one flange 132 extending therefrom. The flange 132 has an opening defined therethrough as shown in FIG. 4. The air director means also includes a retaining member 134 which is shown connected to the lining 10 of the conventional ceiling of the semitrailer 4. The retaining member 134 has a plurality of holes defined therein. The holes are spaced longitudinally along at least a portion of the length of the retaining member 134. The air director means still further includes means for releasably securing the plate 128 to the retaining member 134 in selectable positions so that different quantitites of the temperature-controlled air can be directed towards the damper housing 100. In the preferred embodiment the means for releasably securing the plate 128 to the retaining member 134 includes a pin 136 for holding the plate 128 adjacent the retaining member 134 with the opening of the flange 132 in alignment with a selected one of the plurality of holes of the retaining member 134. Through this cooperation of the elements of the air director means, the plate 128 can be positioned at different angles relative to the damper housing 100.

The air return bulkhead 200, which is another principal part of the apparatus 2 of the present invention, and which will next be described with reference primarily to FIG. 5-8, provides means for communicating to an inlet of the air treatment unit 32 the return air channeled through the return ducts of the false ceiling assembly. The bulkhead 200 is connectibile to the transportable body 4 adjacent the fixed front wall 28, through which the unit 32 is mounted to the body 4, so that the bulkhead 200 provides a second wall built out from (i.e., more inwardly from) the fixed front wall 28. The bulkhead 200 is connected also so that it adjoins the false ceiling 48 in a manner which requires return air flowing through the false ceiling ducts 72, 74 to circulate within the bulkhead 200 for being channeled directly to the inlet of the unit 32 without first passing from the outlets 88, 90 of the ducts 72, 74 into the compartment 38 and thus without mixing with the temperature-treated air in the compartment 38. The bulkhead 200 is connected to the transportable body 4 by mounting means (more specifically identified hereinbelow) for removably mounting the air return bulkhead 200 within the transportable body 4 in the aforementioned manner wherein the air return bulkhead provides a removable wall adjacent the fixed wall 28 and in communication with the air return passageway or passageways of the false ceiling 48 and with the air treatment unit 32. It is contemplated that within the scope of the invention the bulkhead 200 can be permanently mounted within the body 4 if desired; however, the preferred embodiment will be described with respect to a removable type of mounting.

The bulkhead 200 includes two "square-Z" shaped vertical support members 202, 204 which extend from the floor 18 of the trailer 4 to respective locations adjacent the lower edges of the ducts 72, 74 of the false ceiling 48. The support member 202 has a central web 206 (FIG. 8) interconnecting two parallel end flanges 208, 210. The flange 208 has a plurality of holes defined through it for receiving screws 212 which attach the support member 202 adjacent the front wall 28 by connecting to a structural support member 214 of the trailer 4. The screws 212 exemplifiably define attachment means of the mounting means by which the bulkhead 200 is removably connected to the trailer 4. The screws 212 are used for attaching the vertical support member 202 to the front wall 28 between one of the side walls of the trailer 4 and one side of the air treatment unit 32 so that the web 206 extends perpedicularly from the inside of the wall 28.

The support member 204 is identically constructed in that it includes a central web 216 extending perpendicularly between oppositely directed, parallel flanges 218, 220. Screws 222 exemplifiably define another attachment means, this one for attaching the vertical support member 204 to the front wall 28 between the other side wall of the trailer 4 and the other side of the air treatment unit 32 so that the web 216 extends pependicularly from the inside surface of the front wall 28. The screws 222 attach to another structural support member 224 of the trailer 4 as illustrated in FIG. 8. The screws 222 define another part of the mounting means by which the bulkhead 200 is removably mounted to the trailer 4.

The lower portions of the webs 206, 216 have one or more holes 225 defined, such as by drilling or punching, therethrough. An example of these holes 225 is illustrated by the fragment of the support member 202 illustrated in FIG. 7. These holes provide horizontal outlets for the return air to exit from vertical channels defined in part by the support members 202, 204 as more particularly described hereinbelow.

The bulkhead 200 also includes a horizontal sill member 226 which in the illustrated embodiment is an elongated flat member having a rectangular cross section. One end of the member 226 is attached to the flange 210 of the vertical support member 202, and the other end of the sill member 226 is connected to the flange 200 of the support member 204. These attachments are by suitable attachment means, such as screws, for attaching the sill member 226 to the vertical support members 202, 204 intermediate the ends of the support members 202, 204 so that the sill member 226 is spaced from the inside surface of the front wall 28 to define a vertical opening 228 communicating with an inlet of the air treatment unit 32.

The bulkhead 200 also includes baffle means for directing the flow of air within a portion of the bulkhead 200 towards the outlet 228, and specifically to an area of the outlet 228 nearest to where the inlet of the unit 232 is located. As illustrated in FIGS. 3, 5 and 6, the baffle means includes four baffle elements which are defined by respective "square-Z" shaped support members 230, 232, 234, 236 having cross-sectional shapes identical to the support members 202, 204. The baffle members 230, 232, 234, 236 can be connected to the front wall 28 or, and probably more easily, at their respective ends to the sill member 226 and a horizontal support member 238 connected to the flanges 210, 220 of the vertical support members 202, 204 near the lower ends thereof but spaced above the floor 18 of the trailer 4. The member 238 has the same shape as, but is longer than, the sill member 226. The member 238 extends parallel to the sill member 226.

The baffle 236 is connected perpendicularly between the members 226, 238, and the other three baffles are connected between the members 226, 238 at increasingly larger acute angles to the baffle 236 as is apparent in FIG. 5.

In addition to being connected to the vertical support members 202, 204, the horizontal support member 238 is connected by screws to "square-Z" shaped support spacers 240, 242 which extend from the floor 18 of the trailer 4 to a height substantially equal to the distance the upper edge of the horizontal support member 238 is spaced above the floor 18. The spacers 240, 242 extend parallel to, and in between, the vertical support members 202, 204.

The bulkhead 200 still further includes covering means for defining within the trailer 4 an inner surface parallel to, and spaced from, the inside surface of the front wall 28 of the trailer 4. In the illustrated embodiment the covering means includes one or more metallic or non-metallic planar sheets all identified by the reference numeral 244. The covering 244 is connected to the flanges 210, 220, and it can also be connected to the structural elements 226, 230, 232, 234, 236, 238 as desired. The covering 244 is substantially coextensive with the area between the support member 202 and its nearest side wall of the trailer 4, and with the area between the support member 204 and its nearest side wall of the trailer 4, and with the area between the sill member 226 and the lower horizontal support member 238. Attachment of the cover 244 is by suitable means, such as screws. By extending downwardly only to the horizontal support member 238, the covering 244 leaves a void from this location on down to the floor 18 of the trailer 4. This void includes openings 246, 248, 250, 252, 254 defining lower inlets into the bulkhead 200 adjacent the floor 18. Air is received through these inlets from outside the false ceiling 48 and outside the bulkhead 200. Thus, although the return air coming from the ducts 72, 74 of the false ceiling 48 is communicated directly into the bulkhead 200 without first mixing with the air within the compartment 38, air from the compartment 38 can flow into the inles 246, 248, 250, 252, 254 for circulation with the return air from the false ceiling 48 to the inlet of the air treatment unit 32.

This assembly of structural elements defining the bulkhead 200 is removably attached into the trailer 4 not only by the screws 212, 222, but also by L-shaped or right-angle brackets 256, 258 attached to respective side walls of the trailer 4 by suitable attachment means such as screws 260, 262, respectively. The bracket 256 is connected to the side wall of the trailer 4 nearest to which the vertical support member 202 is located, and the bracket 258 is connected to the side wall of the trailer 4 closest to which the vertical support member 204 is located. One edge of the covering 244 and one end of the lower horizontal support member 238 are attached to the bracket 256 such as by screws 264, and an opposite edge of the covering 244 and the opposite end of the lower horizontal support member 238 are connected to the vertical bracket 258 such as by screws 266.

The vertical support member 202 and the portion of the covering 244 extending therefrom towards the bracket 256 define an air return duct 268 having an inlet 270 and having horizontal outlets defined by the holes 225 formed through the lower portion of the vertical support member 202. The duct 268 is also bounded by the adjacent portions of the front wall 28 and the intersecting side wall of the trailer 4 when the bulkhead 200 is mounted therein by the aforementioned means. When so mounted, the inlet 270 is disposed adjacent the outlet 88 of the duct 72 when the false ceiling 48 is also mounted in the trailer 4. The channel 268 extends below the duct 72 for channeling vertically downwardly the return air exiting the outlet 88.

An air return duct 272 is defined by the vertical support member 204 and that portion of the covering 244 extending from the support member 204 towards the bracket 258. At the top of the channel 272 is an inlet 274 which adjoins the outlet 90 of the duct 74 when the false ceiling 48 and the bulkhead 200 are both appropriately mounted in the trailer 4. Thus, the duct 272 extends below the false ceiling 48 and channels the return air from the duct 74 vertically downwardly through the bulkhead 200. When installed in the trailer 4, the duct, or air return channel, 272 is also defined by the respective adjacent portions of the inside surfaces of the front wall 28 and the intersecting side wall of the trailer 4.

The ducts or channels 268, 272 also have lower air return inlets, which inlets are the previously described inlets 246, 254, respectively. These lower inlets provide for return air from the front compartment 38 in which the bulkhead 200 is disposed adjacent the fixed front wall 28 of the trailer 4.

Air outlet chamber means 276 for channeling the air from the vertical air return channels 268, 272 to the outlet 228 of the air outlet chamber means communicating with the inlet of the air treatment unit 32 is defined by the lower portions of the vertical support members 202, 204 extending below the sill member 226, by the sill member 226, by the portion of the lower horizontal support member 238 extending between the support members 202, 204, and by the respective portion of the covering 244 extending between the vertical support members 202, 204. Disposed within this air outlet chamber means are the baffles 230, 232, 234, 236, each of which has one or more holes defined through its central web portion in a manner similar to the holes 225 in the vertical support members 202, 204. When the bulkhead 200 is mounted in the trailer 4, the air outlet chamber means is also defined by the respective adjacent portion of the inner surface of the wall 28.

In extending between the support members 202, 204, the air outlet chamber 276 communicates with the vertical return air channels 268, 272 through the outlet holes 225 defined through the support members 202, 204. The outlet of the chamber 276 is defined by the previously described outlet 228. Additional inlets into the chamber 276 are defined by the openings 248, 250, 252 which allow air from the compartment 38 to flow directly into the chamber 276.

The previously described elements of the present invention can be made of any suitable material, either metallic or nonmetallic, as would be readily known to those skilled in the art.

When the apparatus 2 is installed in the semitrailer 4 as shown in FIG. 1, the apparatus 2 controls the flow of the temperature-treated air from the unit 32 and the compartment 38 into the compartment 42 and back to the unit 32. The temperature-treated air (e.g., refrigerated air) is discharged into the compartment 38 by means of a blower which is a part of the mechanical unit 32 (such as an air conditioning or refrigeration unit). A selectable amount of this air is deflected by the plate 128 which functions as a pickup blade or scoop. The position of the plate 128 can be adjusted for the amount of air to be deflected. This adjustment is achieved by means of the adjustment pin 136 cooperating with the opening in the flange 132 and a selected one of the holes of the retaining member 134.

The air diverted by the plate 128 is directed toward the inlet structure 102 of the damper housing 100. When the damper 112 is closed as shown in FIG. 4, the directed air cannot enter the duct 70, whereby no temperature-treated air will be distributed into the rear compartment 42. The deflected air which is blocked by the closed damper 112 spills over the sides of the plate 128 for utilization in the front compartment 38. When the rear compartment 42 requires temperature-treated air, then the solenoid 118 is activated by the thermostat means 124 so that the damper 112 is moved to its open position and the directed air is allowed to enter the duct 70 for use in the compartment 42. This operation enables the passageway control means 50 to function as a temperature-controlled shutter mechanism.

The thermostat means 124 is a suitable temperature-sensitive device which can be manually set to a desired temperature thereby providing a predetermined control once the apparatus 2 is placed in operation. This type of device is of a suitable type as known to the art.

When the temperature-treated air is allowed to flow into and through the duct 70, the air will move into the compartment 42 and circulate therethrough over the cargo contained in the compartment 42. If the air is refrigerated air, it will normally fall toward the floor 18 thereby displacing the warmer air and forcing it to flow upward and through the return ducts 72 and 74. This warmer return air passes through the ducts 72, 74 and flows into the inlets 270, 274 of the bulkhead 200 through the outlets 88, 90, respectively. This warmer air is returned through the bulkhead 200 to be recycled through the unit 32 so that the air is again temperature-treated and reused through the apparatus 2 of the present invention.

Thus, when the damper 112 is open, an imbalance of air within the compartment 42 occurs as a result of the velocity of the temperature-treated air blown from the unit 32 and as a result of the temperature differential between the treated air and the air already in the compartment 42. When the damper 112 is closed so that no temperature treated air is introduced into the compartment 42, the air within the compartment 42 will remain relatively stable as to movement. This stability can be further enhanced by means of a return air shutter (not shown) constructed of metallic or non-metallic material. Such a return air shutter would block the passage of any temperature-treated air that might enter the return air ducts 72, 74 and disrupt the balance of air in the compartment 42. Such a shutter would be located at the front or rear of each of the return air ducts 72, 74.

And air which is forced into the ducts 72, 74 and flowed therethrough, exits through the outlets 88, 90 into the inlets 270, 274 of the vertical air return channels 268, 272 of the bulkhead 200. This return air is circulated within the bulkhead 200 by moving downwardly through the channels 268, 272, into the chamber 276 and out the outlet 228. The support members of the bulkhead 200 are constructed to include the holes 225 so that minimal obstruction to this flow occurs. The air flow within the bulkhead 200 can be directed to wherever the return air inlet of the air treatment unit 32 is by appropriately adjusting the positions of the baffles 230, 232, 234, 236. Because the return air inlet can vary in location with respect to the various types of units 32 which might be used in a particular trailer 4, the construction of the bulkhead 200 is such that the baffles can be moved to favor the desired recommended air return of the particular mechanical air treatment unit being utilized.

The air return bulkhead 200 effectively prevents the mixture of the return air with the temperature treated air that is being utilized in the front compartment 38. This return air bulkhead 200 also effectively permits the return air from the front compartment 38 to be recycled by means of the lower inlets 246, 248, 250, 252, 254. The return air bulkhead 200 is also constructed to permit removal of the side panels defining the covering 244 to facilitate servicing of the mechanical unit 32 if needed.

When the transportable body, such as the semitrailer 4, is configured as a single compartment, the apparatus 2 provides a means of enhancing the distribution of the temperature-treated air because a certain amount of the air discharged by the unit 32 is funneled by the apparatus 2 toward the center of the transportable body before being placed into the circulation cycle.

It is to be noted that the insulation 58 used in the duct housing 54 serves as a protective barrier for any commodities that come into contact with the lower liner 56. This is particularly desirable when the compartment 38 is maintained at a subfreezing temperature whereby the diverted air coming down the duct 70 will be at a sub-freezing temperature. Because of the insulation 58, this sub-freezing temperature is not transferred through the duct housing 54 to the cargo stored in the compartment 42.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. An apparatus for providing temperature control to a compartment of a transportable body having a roof and having air treatment means for providing temperature-treated air to a location within the interior of the transportable body below the roof, the air treatment means mounted to the transportable body through a wall thereof depending from the roof, said apparatus comprising:

a duct housing connected to the transportable body below the roof, said duct housing including:

first duct means for channeling temperature-treated air away from an outlet of the air treatment means and into the compartment of the transportable body; and second duct means, connected to said first duct means, for channeling air from the compartment of the transportable body towards the wall through which the air treatment means is mounted to the transportable body; and air return bulkhead means, connected to the transportable body adjacent the wall through which the air treatment means is mounted to the transportable boy, for communicating to an inlet of the air treatment means the air channeled through said second duct means.

2. An apparatus for providing temperature control to a compartment of a transportable body having a roof and having air treatment means for providing temperature-treated air to a location within the interior of the transportable body below the roof, the air treatment means mounted to the transportable body through a wall thereof depending from the roof, said apparatus comprising:

a duct housing connected to the transportable body below the roof, said duct housing including:

first duct means for channeling temperature-treated air away from an outlet of the air treatment means and into the compartment of the transportable body; and second duct means, connected to said first duct means, for channeling air from the compartment of the transportable body towards the wall through which the air treatment means is mounted to the transportable body; and air return bulkhead means, connected to the transportable body adjacent the wall through which the air treatment means is mounted to the transportable body, for communicating to an inlet of the air treatment means the air channeled through said second duct means, said air return bulkhead means including:

vertical air return means, extending below said second duct means and adjacent the wall, for channeling the air vertically downwardly; and air outlet chamber means, connected adjacent said vertical air return means and the wall, for channeling the air from said vertical air return means to an outlet of said air outlet chamber means communicating with the inlet of the air treatment means.

3. An apparatus as defined in claim 2, wherein said air return bulkhead means further includes baffle means, disposed in said air outlet chamber means, for directing the flow of air within said air outlet chamber means towards said outlet thereof.

4. An apparatus as defined in claim 2, wherein said air return bulkhead means further includes inlet means, disposed adjacent a floor of the transportable body, for receiving into said air outlet chamber means, air from outside said duct housing and said air return bulkhead means.

5. An apparatus for providing temperature control to a compartment of a transportable body having a roof and having air treatment means for providing temperature-treated air to a location within the interior of the transportable body below the roof, the air treatment means mounted to the transportable body through a wall thereof depending from the roof, said apparatus comprising:

a duct housing connected to the transportable body below the roof, said duct housing including:

first duct means for channeling temperature-treated air away from an outlet of the air treatment means and into the compartment of the transportable body;

second duct means, connected to said first duct means, for channeling air from the compartment of the transportable body towards the wall through which the air treatment means is mounted to the transportable body; and third duct means, connected to said first duct means, for channeling air from the compartment of the transportable body towards the wall through which the air treatment means is mounted to the transportable body; and air return bulkhead means, connected to the transportable body adjacent the wall through which the air treatment means is mounted to the transportable body, for communicating to an inlet of the air treatment means the air channeled through said second duct means, said air return bulkhead means including:

a first air return duct, extending below said duct housing and having an inlet adjacent an outlet of said second duct means, said first air return duct having a horizontal outlet;

a second air return duct, extending below said duct housing and having an inlet adjacent an outlet of said third duct means, said second air return duct having a horizontal outlet and said second air return duct disposed parallel to said first air return duct; and an air outlet chamber, disposed between said first and second air return ducts in communication with said horizontal outlets of said first and second air return ducts, said air outlet chamber having a vertical outlet communicating with the inlet of the air treatment means so that air circulated from the outlet of the air treatment means, through said first duct means, through the compartment of the transportable body and through said second and third duct means is returned therefrom through said first and second air return ducts and said air outlet chamber to the inlet of the air treatment means.

6. An apparatus for providing temperature control to two compartments of a transportable body having a fixed ceiling and having a fixed wall through which air treatment means for providing temperature-treated air communicates the temperature-treated air for use within the interior of the transportable body, said apparatus comprising:

a duct housing having three ducts defined therein in side-by-side relationship so that a first duct is disposed between a second duct and a third duct of said three ducts, each of said three ducts having an inlet and an outlet;

first mounting means for removably mounting said duct housing within the transportable body so that said duct housing provides a removable ceiling within the transportable body below the fixed ceiling and so that the inlet of said first duct and the outlets of said second and third ducts are disposed in a first one of the compartments of the transportable body and the outlet of said first duct and the inlets of said second and third ducts are disposed in a second one of the compartments;

air return bulkhead means for channeling air from the outlets of said second and third ducts to the air treatment means substantially without the air from the outlets first passing from the outlets of said second and third ducts into said first one of the compartments; and second mounting means for removably mounting said air return bulkhead means within the transportable body so that said air return bulkhead means provides a removable wall adjacent the fixed wall of the transportable body and so that said air return bulkhead means adjoins said second and third ducts.

7. An apparatus for providing temperature control to two compartments of a transportable body having a fixed ceiling and having a fixed wall through which air treatment means for providing temperature-treated air communicates the temperature-treated air for use within the interior of the transportable body, said apparatus comprising:

a duct housing having three ducts defined therein in side-by-side relationship so that a first duct is disposed between a second duct and a third duct of said three ducts, each of said three ducts having an inlet and an outlet;

first mounting means for removably mounting said duct housing within the transportable body so that said duct housing provides a removable ceiling within the transportable body below the fixed ceiling and so that the inlet of said first duct and the outlets of said second and third ducts are disposed in a first one of the compartments of the transportable body and the outlet of said first duct and the inlets of said second and third ducts are disposed in a second one of the compartments;

air return bulkhead means for channeling air from the outlets of said second and third ducts to the air treatment means substantially without the air from the outlets first passing from the outlets of said second and third ducts into said first one of the compartments, said air return bulkhead means including:

a first vertical support member having a first web through which a first hole is defined;

a second vertical support member having a second web through which a second hole is defined;

a horizontal sill member;

sill member attachment means for attaching said sill member to said first and second vertical support members intermediate the ends of said support members so that said sill member is spaced from the fixed wall of the transportable body to define an opening communicating with the air treatment means;

covering means for defining within the transportable body an inner surface parallel to, and spaced from, the fixed wall; and covering attachment means for attaching said covering means to said first and second vertical support members and to said sill member so that an air outlet chamber is defined by lower portions of said first and second vertical support members and by said covering means below said sill member, and further so that a first air return channel is defined by said first vertical support member and said covering means for channeling air downwardly for passage through said first hole into said air outlet chamber and return to the air treatment means through said outlet, and still further so that a second air return channel is defined by said second vertical support member and said covering means for channeling air downwardly for passage through said second hole into said air outlet chamber and return to the air treatment means through said outlet; and second mounting means for removable mounting said air return bulkhead means within the transportable body so that said air return bulkhead means provides a removable wall adjacent the fixed wall of the transportable body and so that said air return bulkhead means adjoins said second and third ducts, said second mounting means including:

first vertical support member attachment means for attaching said first vertical support member to the fixed wall of the transportable body so that said first web extends from the fixed wall;

second attachment means for attaching said second vertical support member to the fixed wall of the transportable body so that said second web extends from the fixed wall;

a first vertical bracket;

first vertical bracket attachment means for attaching said first vertical bracket to a side wall of the transportable body;

a second vertical bracket; and second vertical bracket attachment means for attaching said second vertical bracket to another side wall of the transportable body.

8. An apparatus as defined in claim 7, wherein said covering means extends below said sill member to a location short of a floor of the transportable body so that a lower inlet into said first air return channel is defined adjacent the floor, a lower inlet into said second air return channel is defined adjacent the floor, and a lower inlet into said air return chamber is defined adjacent the floor.

9. An apparatus as defined in claim 8, further comprising:

a baffle; and baffle attachment means for attaching said baffle within said air return chamber between said sill member and said lower inlet into said air return chamber.

10. An apparatus as defined in claim 7, further comprising:

a damper housing, including:

an inlet structure;

an outlet structure disposed in fluid communication with the inlet of said first duct; and a tapered neck portion connecting said inlet structure with said outlet structure;

a damper pivotally connected within said inlet structure;

air director means, connected to said damper housing, for adjustably directing at least a portion of the temperature-treated air toward said damper housing when said duct housing is mounted in said transportable body; and movement means for moving said damper between an open position and a closed position.

11. An apparatus as defined in claim 7, wherein said first, second and third ducts extend parallel to each other and said first duct is offset so that said second duct is wider than said third duct.

12. An apparatus for providing temperature control to at least two compartments of a transportable body having a fixed ceiling and having air treatment means for providing temperature-treated air to the interior of said transportable body, comprising:
   false ceiling means for providing a first passageway and a second passageway between at least a first one of the compartments and a second one of the compartments, said false ceiling means including:
      a duct housing having a plurality of ducts defined therein; and
      first mounting means for removably mounting said duct housing within the transportable body so that said duct housing provides a second ceiling within the transportable body below the fixed ceiling;
   passageway control means, associated with an end of said first passageway which is disposed in said first one of the compartments when said false ceiling means is mounted in the transportable body, for controlling the introduction of the temperature-treated air into said first passageway;
   air channeling means for adjustably channeling at least a portion of the temperature-treated air to said passageway control means;
   air return bulkhead means for channeling return air from said second passageway to the air treatment means without the return air first passing from said second passageway into said first one of the compartments; and
   second mounting means for removably mounting said air return bulkhead means within the transportable body in communication with said second passageway and the air treatment means.

13. An apparatus for providing temperature control to at least two compartments of a transportable body having a fixed ceiling and having air treatment means for providing temperature-treated air to the interior of said transportable body, comprising:
   false ceiling means for providing a first passageway and a second passageway between at least a first one of the compartments and a second one of the compartments, said false ceiling means including:
      a duct housing having a plurality of ducts defined therein; and
      first mounting means for removably mounting said duct housing within the transportable body so that said duct housing provides a second ceiling within the transportable body below the fixed ceiling;
   passageway control means, associated with an end of said first passageway which is dispsoed in said first one of the compartments when said false ceiling means is mounted in the transportable body, for controlling the introduction of the temperature-treated air into said first passageway;
   air channeling means for adjustably channeling at least a portion of the temperature-treated air to said passageway control means;
   air return bulkhead means for channeling return air from said second passageway to the air treatment means without the return air first passing from said second passageway into said first one of the compartments, said air return bulkhead means including:
      vertical air return means, extending below said second passageway, for channeling the return air vertically downwardly; and
      air outlet chamber means, connected adjacent said vertical air return means, for channeling the air from said vertical air return means to an outlet of said air outlet chamber means communicating with the air treatment means; and
   second mounting means for removably mounting said air return bulkhead means within the transportable body in communication with said second passageway and the air treatment means.

14. An apparatus as defined in claim 13, wherein said air return bulkhead means further includes baffle means, disposed in said air outlet chamber means, for directing the flow of air within said air outlet chamber means towards said outlet thereof.

15. An apparatus as defined in claim 13, wherein said air return bulkhead means further includes inlet means, disposed adjacent a floor of the transportable body, for receiving into said air outlet chamber means, air from outside said false ceiling means and said air return bulkhead means.

16. An air return bulkhead assembly for removable installation adjacent an inside surface of a front wall of a trailer also having two side walls extending from opposite ends of the front wall, through which front wall is disposed an air treatment apparatus for receiving air through an inlet, for temperature treating the air and for providing the temperature-treated air through an outlet, said bulkhead assembly comprising:
   a first vertical support member having a first web through which a first hole is defined;
   first attachment means for attaching said first vertical support member to the front wall of the trailer between one of the side walls of the trailer and the air treatment apparatus so that said first web extends from the inside surface of the front wall;
   a second vertical support member having a second web through which a second hole is defined;
   second attachment means for attaching said second vertical support member to the front wall of the trailer between the other side wall of the trailer and the air treatment apparatus so that said second web extends from the inside surface of the front wall;
   a first vertical bracket;
   third attachment means for attaching said first vertical bracket to one of the side walls of the trailer;
   a second vertical bracket;
   fourth attachment means for attaching said second vertical bracket to the other side wall of the trailer;
   a horizontal sill member;
   fifth attachment means for attaching said sill member to said first and second vertical support members intermediate the ends of said support members so that said sill member is space from the inside surface of the front wall of the trailer to define an opening communicating with the inlet of the air treatment apparatus;
   covering means for defining within the trailer an inner surface parallel to, and spaced from, the inside surface of the front wall of the trailer; and
   sixth attachment means for attaching said covering means to said first and second vertical support members, to said first and second vertical brackets and to said sill member so that an air outlet chamber is defined by lower portions of said first and second vertical support members and the inside surface of the front wall and said covering means below said sill member, and further so that a first air return channel is defined by said first vertical support member, the one side wall, the inside surface and said covering means for channeling air downwardly for passage through said first hole into said air outlet chamber and return to the inlet of the air treatment apparatus through said outlet, and still further so that a second air return channel is defined by said second vertical support member, the other side wall, the inside surface and said covering means for channeling air downwardly for passage through said second hole into said air outlet chamber and return to the inlet of the air treatment apparatus through said outlet.

17. A bulkhead assembly as defined in claim 16, wherein said covering means extends below said sill member to a location short of a floor of the trailer so that a lower inlet into said first air return channel is defined adjacent the floor, and so that a lower inlet into said second air return channel is defined adjacent the floor, and so that a lower inlet into said air return chamber is defined adjacent the floor.

18. A bulkhead assembly as defined in claim 17, further comprising:
   a baffle; and
   seventh attachment means for attaching said baffle within said air return chamber between said sill member and said lower inlet into said air return chamber.

* * * * *

UNITED STATES PATENT AND TRADEMARK OFFICE
CERTIFICATE OF CORRECTION

PATENT NO. : 4,726,196

DATED : February 23, 1988

INVENTOR(S) : Albert H. Zajic

It is certified that error appears in the above-identified patent and that said Letters Patent are hereby corrected as shown below:

Cover page, in "References Cited", after "U.S. PATENT DOCUMENTS", insert as a separate publication, --Polar-American brochure on Super Grocer--;
Column 4, line 6, change "member" to --members--;
Column 7, line 12, change "61" to --62--;
Column 7, line 32, change "75" to --76--;
Column 11, line 58, change "inles" to --inlets--;
Column 14, line 4, change "And" to --Any--; and
Column 15 (claim 1), line 13, change "boy," to --body,--.

Signed and Sealed this

Fourteenth Day of June, 1988

Attest:

DONALD J. QUIGG

Attesting Officer

Commissioner of Patents and Trademarks